United States Patent [19]

Tanaka et al.

[11] Patent Number: 5,115,138

[45] Date of Patent: May 19, 1992

[54] ULTRAVIOLET RAY DETECTING DEVICE

[75] Inventors: Satoru Tanaka; Fumio Matsui, both of Saitama, Japan

[73] Assignee: Pioneer Electronic Corporation, Tokyo, Japan

[21] Appl. No.: 625,713

[22] Filed: Dec. 11, 1990

[30] Foreign Application Priority Data

Jul. 4, 1990 [JP] Japan .................. 2-71433[U]

[51] Int. Cl.⁵ .............................................. G01J 1/58
[52] U.S. Cl. ............................ 250/485.1; 250/372; 250/458.1
[58] Field of Search ............. 250/372, 485.1, 227.18, 250/458.1, 459.1

[56] References Cited

U.S. PATENT DOCUMENTS

| | | | |
|---|---|---|---|
| 1,777,999 | 10/1930 | Foulke | 250/485.1 |
| 4,201,916 | 5/1980 | Ellner | 250/372 |
| 4,371,897 | 2/1983 | Kramer | 250/458.1 |
| 4,935,631 | 6/1990 | Mosley et al. | 250/458.1 |

*Primary Examiner*—Carolyn E. Fields
*Assistant Examiner*—Drew A. Dunn
*Attorney, Agent, or Firm*—Sughrue, Mion, Zinn Macpeak & Seas

[57] ABSTRACT

An ultraviolet ray detecting device comprises an external light shielding structure for shielding an external light from entering there, a fluorescent member disposed in the external light shielding structure and containing a fluorescent substance, the fluorescent member being excited by an ultraviolet ray to thereby generate a fluorescence ray from the fluorescent substance, a light entrance window through which a light is guided and emitted to the fluorescent member, an ultraviolet ray pass filter for extracting the ultraviolet ray from the light through the light entrance means, and a light discharging window adapted to discharge the fluorescence ray generated by the excitation fo the fluorescent member. The ultraviolet ray pass filter may be eliminated to limit the light incident angle. The light shielding structure may be composed of a box or tubular member. The fluorescence ray discharging window is eliminated and a photodiode is disposed in contact to one end of the fluorescent member. A light emitting diode is disposed to the other end of the fluorescent member for preliminarily coloring the fluorescent member.

14 Claims, 3 Drawing Sheets

ULTRAVIOLET RAY DETECTING DEVICE

BACKGROUND OF THE INVENTION

The present invention relates to a device or unit having a simple structure for easily detecting ultraviolet rays.

One typical example of a conventional device for detecting ultraviolet rays comprises an outer casing having a box shape for shielding external lights from entering the casing, a detector for detecting the ultraviolet rays disposed inside the casing and an ultraviolet ray pass filter disposed inside an entrance window formed to the casing as an opening through which light beams enter the casing. The detector is generally constituted by a photodiode, which is sensitive to other light beams as well as the ultraviolet rays and, accordingly, only the ultraviolet rays can be detected by the cooperation of the photodiode and the ultraviolet ray pass filter.

However, in the conventional ultraviolet ray detecting device having the structure described above, it is necessary to incorporate an electric power source to drive the photodiode and the detector is not operated without using the power source, thus being not simple and not easily operated. In addition, a phoodiode having a large light receiving area is required in accordance with the enlargement of the light entrance window, which is not econimical and is inconvenient.

SUMMARY OF THE INVENTION

An object of the present invention is to substantially eliminate defects or drawbacks encountered in the prior art described above and to provide an ultraviolet ray detecting device having a simple structure and capable of being easily handled and detecting the ultraviolet ray.

This and other objects can be achieved according to the present invention by providing an ultraviolet ray detecting device comprising an external light shielding structure for shielding an external light from entering there, a fluorescent member disposed in the external light shielding structure and containing a fluorescent substance, the fluorescent member being excited by an ultraviolet ray to thereby generate a fluorescence ray from the fluorescent substance and the fluorescent member being provided with one end through which the fluorescence ray is discharged, a light entrance means through which a light is guided and projected to the fluorescent member, a member for extracting the ultraviolet ray from the light through the light entrance means, and a light discharging means adapted to discharge the fluorescence ray generated by the excitation of the fluorescent member.

In a preferred embodiment, the external light shielding struture has a box shape of substantially a rectangular configuration and the light entrance means is a light entrance window formed in the shielding box and the light discharging means is a light discharging window formed in the shielding box at a portion corresponding to one end of said fluorescent member disposed in the shielding box. The ultraviolet ray extracting member may comprise an ultraviolet ray pass filter or member for allowing a light having only a limited incident angle to enter the light shielding structure.

The fluorescent member may be composed of a flexible material having a fiber-like shape and the external light shielding structure has a tubular structure into which the fiber-like fluorescent member is disposed with both ends thereof being uncovered with the shielding structure, both the ends thereof being formed as light entrance means and light discharging means, respectively.

In a further preferred embodiment, the fluorescence ray discharging means is eliminated and a photodiode is disposed in contact with the one end, through which the fluorescence ray is discharged, of the fluorescent member.

In a further preferred embodiment, a light emitting diode is disposed to the other end of the fluorescent member for preliminarily coloring the fluorescent member.

According to the structures and characters of the ultraviolet ray detecting device according to the present invention, the ultraviolet ray selectively entering the light entrance window in the external light shielding structure excites the fluorescent member disposed in the shielding structure and the fluorescence ray is thereby generated from the fluorescent substance contained in the fluorescent member. The fluorescence ray is totally reflected and discharged and the discharged quantity is easily observed. The location of the light emitting diode makes it possible to visually observe the colored fluorescence ray.

BRIEF DESCRIPTION OF THE DRAWINGS

For a better understanding of the present invention and to show how the same is carried out, reference is now made, by way of preferred embodiments, to the accompanying drawings, in which.

DESCRIPTION OF THE PREFERRED EMBODIMENTS

Figure 1:
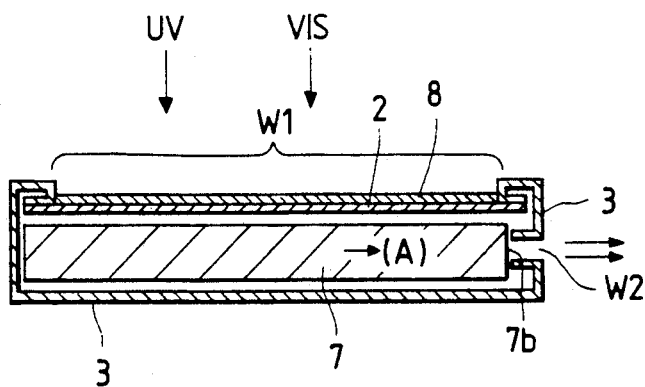
FIG. 1 is an elevational section of the first embodiment of an ultraviolet ray detecting device according to the present invention.

A first embodiment according to the present invention is described hereunder with reference to FIG. 1.

Referring to FIG. 1, an ultraviolet ray detecting device 1 comprises an external light shielding member 3 generally having a box-like structure for shielding the entrance of the external light thereinto, a fluorescent member 7 disposed in the shielding member 3 and containing a fluorescent substance which is excited by ultraviolet rays and thereby generates a fluorescence ray, means through which the light enters the shielding member 3, that is, entrance window W1 in this embodiment formed at an upper portion, as vieweed, of the shielding member 3, an ultraviolet ray pass filter 2 as means for extracting only the ultraviolet ray from the incident light and means for discharging the fluorescence ray generated from the fluorescent member 7 excited by the ultraviolet ray, that is, light discharge window W2 in this embodiment formed at the side of the shielding member 3.

In the illustrated embodiment, in more detail, the fluorescent member 7 had substantially a rectangular plate structure containing the fluorescent substance for generating the fluorescence ray. The fluorescent member 7 is prepared by containing the fluorescent substance, such as 3.9-diphenylthio perylenedicarboxylate or pyperidinium tetrakis (benzoyltrifluoroacetonato) europium (III), with a resin and then by forming the thus mixed substance so as to have a predetermined shape. In the fluorescent member 7 thus formed contains the fluorescent substance of 0.01 to 0.2 weight %. The resin as the base material for the fluorescent member 7 is prepared by polymethylmethacrylate (PMMA) or polystyrene, for example.

The fluorescent member 7 thus prepared is surrounded by the box-shaped external light shielding member 3 provided with the light entrance window W1 and the light discharging window W2, both described later herein. The shielding member 3, i.e. shielding box, has a property for preventing the external light from entering the shielding box 3. The light entrance window W1 is not covered with the shielding member 3 and the ultraviolet ray pass filter 2 as ultraviolet ray extracting means is disposed to the entrance window W1 so as to cover the same through a protector plate 8 such as an acrylic regin plate, which is disposed in vicinity of or in contact with the ultraviolet ray pass filter 2 in this embodiment.

The incident light passing through the window W1 is filtered by the ultraviolet ray pass filter 2 and only the ultraviolet ray enters the shielding box 3 and is absorbed by the fluorescent member 7, thus preventing the so-called background noise of a visual light.

The external light shielding box 3 is provided with the light discharging window W2 at a side portion of the light shielding box 3 facing one longitudinal end 7b of the fluorescent member 7 disposed in the shielding box 3 and the window W2 has a slit-like structure having a length extending parallelly to the end face 7b of the fluorescent member 7. The fluorescence ray generated from the fluorescent member 7 excited by the ultraviolet ray is discharged through the light discharging window W2.

The ultraviolet ray detecting device of the first embodiment will be operated in the following manner.

The ultraviolet rays (UV) and other visual rays (VIS) are directed to the light entrance window W1 and only the UV passes into the shielding box 3 through the ultraviolet ray pass filter 2 disposed to the window W1. The UV passing the entrance window W1 is absorbed by the fluorescent member 7 and excites the fluorescent substance contained in the fluorescent member 7 and the excited fluorescent substance generates fluorescence rays in every direction. The generated fluorescence rays are totally repeatedly reflected or not reflected and directed towards the end face 7b of the fluorescent member 7 shown by an arrow A. The fluorescence rays are then discharged through the window W2. Accordingly, the quantity of the ultraviolet rays contained in the incident light passing through the window W2 can be detected by visually observing the intensity of the fluorescence rays of a predetermined color.

Figure 2:
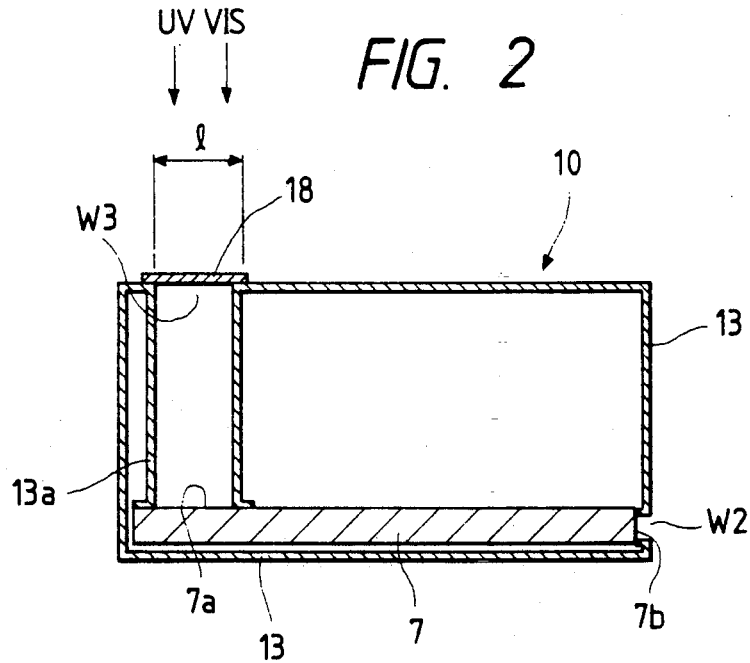
FIGS. 2 to 5 are also elevational sections of the second to fifth embodiments of the ultraviolet ray detecting devices according to the present invention.

FIG. 2 represents a second embodiment according to the present invention.

An ultraviolet ray detecting device 10 shown in FIG. 2 is basically different from that of the first embodiment in the structure of the ultraviolet ray extracting means. Namely, the outer configuration of a light shielding member 13 of a box-like structure is particularly different in height from that of the first embodiment. The light shielding box 13 has a height higher than that of the first embodiment as shown in FIG. 2. Namely, the fluorescent member 7 is disposed in the light shielding box 13 apart from an upper portion, as viewed, of the shielding box 13. A light entrance window W3 is also disposed at a portion apart from an upper surface of the fluorescent member 7 disposed on the bottom of the shielding box 13 and the window W3 has a width shorter than that of the window W1 of the first embodiment. A partition wall member 13a is formed in the shielding box 13 so as to define an ultraviolet ray guide passage for guiding the ulotraviolet ray passing through the window W3 to a fluorescent surface 7a of the fluorescent member 7. Accordingly, the light beams projected on the fluorescent surface 7a of the fluorescent member 7 are reduced to those having only extremely small incident angle being smaller than a critical angle. The light passing through the window W3 transmits substantially vertically as viewed in the fluorescent member 7. Accordingly, the incident light, particularly visual light beam, not being operative total reflection and transferred through the fluorescent member 7. Thus, the visual light beams are not discharged through the light discharging window W2 and only the fluorescence ray of a predetermined fluorescent color excited by the ultraviolet ray is discharged through the window W2.

According to the second embodiment of the character described above, the ultraviolet ray pass filter can be eliminated, and only the acrylic resin plate 18 as a projector plate is located to the entrance opening of the light entrance window W3.

Figure 3:
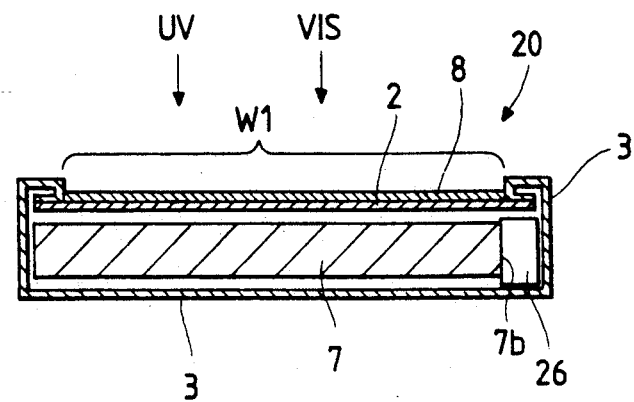

FIG. 3 represents a third embodiment of the ultraviolet ray detecting device 20 according to the present invention. The basic structure and the principle of the third embodiment are basically similar to those of the first embodiment except the following structure. Namely, referring to FIG. 3, a photodiode 26 is disposed at the end face 7b of the fluorescent member 7 to thereby accurately determine the quantity of the ultraviolet ray. In this meaning, the location of the light discharging window W2 may be eliminated. It is possible to utilize the photodiode 26 having relatively a small light receiving surface because the photodiode 26 is utilized merely for receiving the fluorescence ray at the end face 7b of the fluorescent member 7. The ultraviolet ray receiving surface of the fluorescent member 7 can be made large by forming widely the light entrance window W1 and, in this manner, it is not necessary to change the light receiving surface of the photodiode 26.

Figure 4:
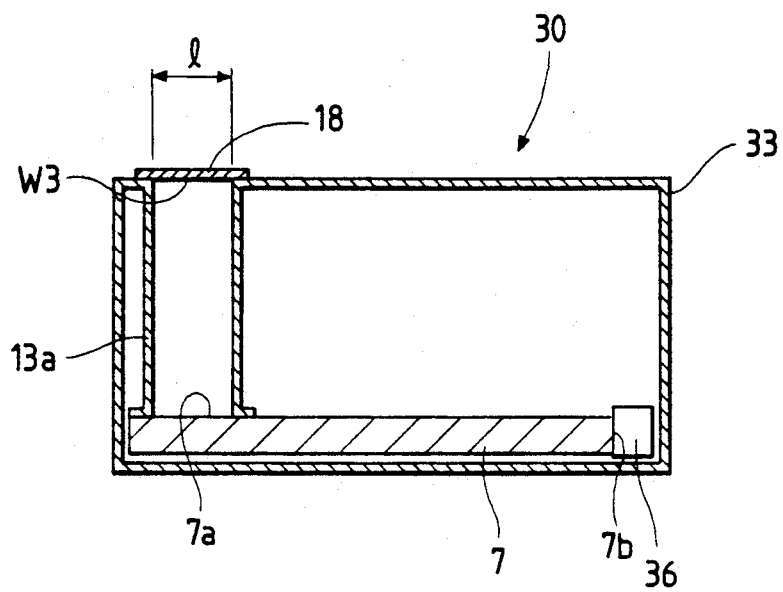

FIG. 4 represents a fourth embodiment of the ultraviolet ray detecting device 30 according to the present invention and this embodiment has a structure having basically similar to that of the second embodiment shown in FIG. 2 including a light-shielding box 33 except that a photodiode 36 is disposed at the end face 7b of the fluroescent member 7 and the window W2 is also eliminated. The function and structure of the photodiode 36 are substantially the same as those of the photodiode 26 of the third embodiment shown in FIG. 3.

A fifth embodiment of the ultraviolet ray detecting device according to the present invention will be described hereunder with reference to FIG. 5.

Figure 5:
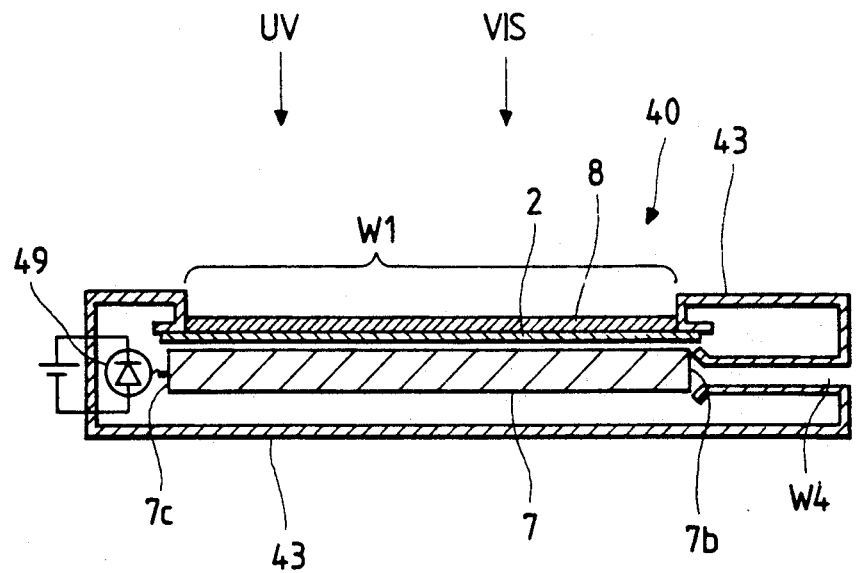

An ultraviolet ray detecting device 40 shown in FIG. 5 has a structure basically identical to that of the first embodiment and it may thus be referred to as a modification of the first embodiment. Referring to FIG. 5, the ultraviolet ray detecting device 40 comprises an external light shielding member 43 having a box-like structure, a fluorescent member 7 of the character described with respect to the first embodiment disposed in the light shielding box 43, a light entrance means formed as a window W1 at the upper opening of the shielding box 43, a protector plate member 8 disposed to cover the window W1 and an ultraviolet ray pass filter 2 disposed inside the protector plate member 8. A fluorescence ray discharging means is disposed on one side of the light shielding box 43 and the fluorescence ray discharging means is formed as an window W4 to which one end 7b of the fluorescent member 7 is faced. In this embodiment, a light emitting diode 49 is disposed on the other end 7c, opposing one end 7b, of the fluorescent member 7. A green luminescence color with constant degree of luminescence is always emitted from the light emitting diode 49. A fluorescent substance contained in the fluorescent member 7 is a substance, such as pyperidinium tetrakis (benzoyltrifluoroacetonato) europium (III), whose luminescence color generated by the excitation of the ultraviolet ray is red. Accordingly, color change based on the composed degree of colors of green, yellow and red is caused in accordance with the intensity of the ultraviolet ray passing through the window W1, whereby the quantity, i.e. intensity, of the ultraviolet ray can be detected by the observation of the color change.

A sixth embodiment of the present invention will be described hereunder with reference to FIGS. 6 and 7.

Figure 6:
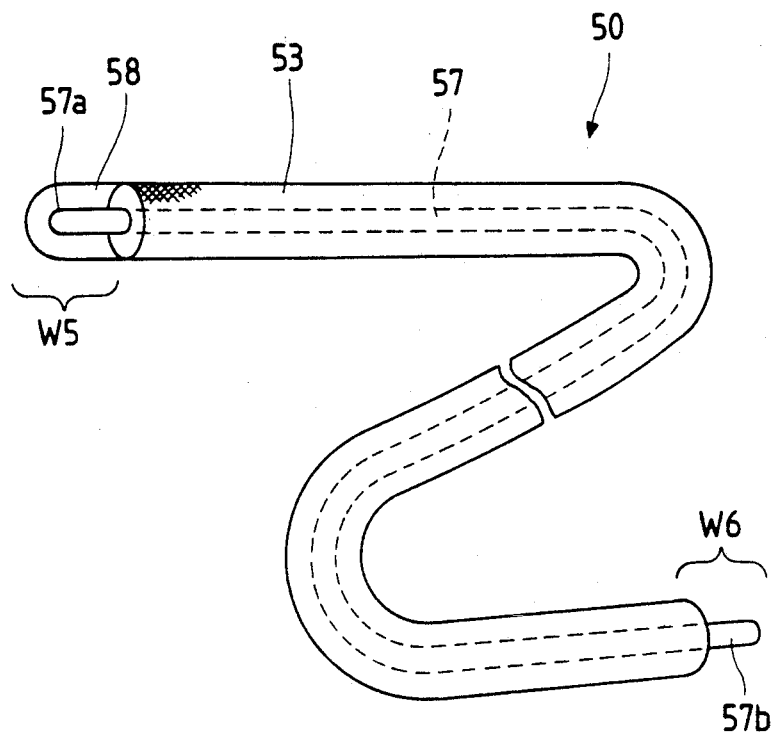
FIG. 6 is a schematic perspective view of the sixth embodiment of the ultraviolet ray detecting device according to the present invention.
Figure 7:
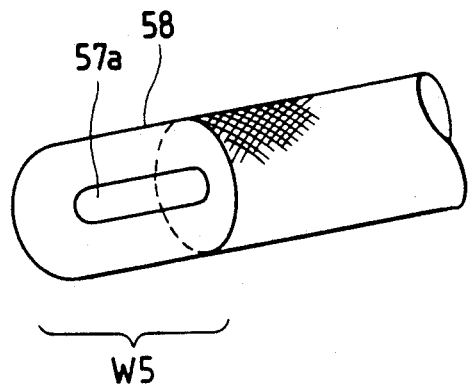
FIG. 7 is an enlarged view of a light entrance portion of the ultraviolet ray detecting device shown in FIG. 6.

Referring to FIGS. 6 and 7, an ultraviolet ray detecting device 50 comprises a flexible fluorescent member 57 formed in an elongated fiber shape, an external light shielding member 53 covering the flexible fluorescent member 57 except both end portions 57a and 57b. In the illustration of FIG. 6, the flexible fluorescent member 57 is shown in a bent manner for the sake of convenience. One end portion 57a of the fluorescent member 57 is covered with an ultraviolet ray pass filter 58 of a cap structure to thereby form a light entrance window W5. The ultraviolet ray pass filter 58 acts as an ultraviolet ray extracting means through which only the ultraviolet ray (UV) passes and is emitted to the fluorescent member 57. The other end portion 57b acts as a light discharging window W6 through which a fluorescence ray emitted by the excitation due to the ultraviolet ray and transmitting in the fluorescent member 57 is discharged.

The ultraviolet ray detecting device 50 according to this embodiment is suitable in use for the location to a narrow position hardly handled by manual hands. Furthermore, in an alternation, the front end of the cap shaped member may be partially covered to introduce only the incidence light having a small incident angle, thus calling as an ultraviolet extracting means such as shown in the embodiments of FIGS. 2 and 4. In such alteration, the cap shaped member 58 may be formed of a material having no ultraviolet ray passing property.

It is to be understood that this invention is not limited to the preferred embodiments of the characters described hereinbefore and many other changes and modifications may be made without departing from the scopes of the appended claims.

What is claimed is:

1. An ultraviolet ray detecting device comprising:
   an external light shielding means for shielding an external light from entering there;
   a fluorescent member disposed in said external light shielding means and containing a fluorescent substance, said fluorescent member being excited by an ultraviolet ray to thereby generate a fluorescence ray from the fluorescent substance, said fluorescent member being provided with one end through which the fluorescence ray is discharged;
   a light entrance means through which a light is guided and emitted to said fluorescent member;
   means for extracting the ultraviolet ray from the light through said light entrance means, including a partition wall member disposed on said fluorescent member and forming said light entrance means, a height of the partition wall member and a width of the light entrance means being regulated so that an incident angle of the light beams projected on a surface of the fluorescent member is smaller that a critical angle of visual light and preventing the visual light from propagating in the fluorescent member with repeating total reflection; and
   a light discharging means provided with a window at a portion of said external light shielding means so as to allow for detection of the quantity of ultraviolet rays by visual observation of an intensity of said fluorescence ray generated by the excitation of said fluorescent member and discharged externally.

2. An ultraviolet ray detecting device according to claim 1, wherein said external light shielding means is a shielding box of substantially a rectangular configuration and wherein said light entrance means is a light entrance window formed in said shielding box and said light discharging means is a light discharging window formed in said shielding box at a portion corresponding to said one end of said fluorescent member disposed in the shielding box.

3. An ultraviolet ray detecting device according to claim 1, further comprising a protector means disposed in vicinity of or in contact with said ultraviolet ray extracting means.

4. An ultraviolet ray detecting device according to claim 1, wherein said window is formed on the external light shielding means at a portion corresponding to the one end of the fluorescent member.

5. An ultraviolet ray detecting device comprising:
   an external light shielding means for shielding an external light from entering therein;
   a fluorescent member disposed in said external light shielding means and containing a fluorescent substance, said fluorescent member being excited by an ultraviolet ray to thereby generate a fluorescent ray from the fluorescent substance, said fluorescent member being provided with one end through which the fluorescent ray is discharged;
   a light entrance means through which a light is guided and projected to said fluorescent member;
   means for extracting the ultraviolet ray from the light through said light entrance means having a partition wall member disposed on said fluorescent member and forming said light entrance means, a height of the partition wall member and a width of the light entrance means being regulated so that an incident angle of the light beams projected on a surface of the fluorescent member is smaller than a critical angle of a visual light and preventing the visual light from propagating in the fluorescent member with repeating total reflection; and a photodiode disposed in contact with said one end of said fluorescent member through which the fluorescent ray is discharged.

6. An ultraviolet ray detecting device according to claim 5, wherein said external light shielding means is a shielding box of substantially a rectangular configuration and wherein said light entrance means is a light entrance window formed in said shielding box.

7. An ultraviolet ray detecting device according to claim 5, further comprising a protector means disposed in vicinity of or in contact with said ultraviolet ray extracting means.

8. An ultraviolet ray detecting device comprising: an external light shielding means for shielding an external light entering there;
   a fluorescent member disposed in said external light shielding means and containing a fluorescent substance, said fluorescent member being excited by an ultraviolet ray to thereby generate a fluorescence ray from the fluorescent substance, said fluorescent member being provided with two end portions through one of which the fluorescence ray is discharged;
   a light entrance means through which a light is guided and emitted to said fluorescent member;
   means for extracting the ultraviolet ray from the light through said light entrance means;
   a light discharging means adapted to discharge the fluorescence ray generated by the excitation of said fluorescent member; and
   means connected to another one end of said fluorescent member for preliminarily coloring said fluorescent member.

9. An ultraviolet ray detecting device according to claim 8, wherein said external light shielding means is a shielding box of substantially a rectangular configuration and wherein said light entrance means is a light entrance window formed in said shielding box and said light discharging means is a light discharging window formed in said shielding box at a portion corresponding to said one end of said fluorescent member disposed in the shielding box.

10. An ultraviolet ray detecting device according to claim 8, wherein said means for extracting the ultraviolet ray comprises an ultraviolet ray pass filter.

11. An ultraviolet ray detecting device according to claim 8, wherein said means for extracting the ultraviolet ray comprises a member formed in said shielding means for allowing a light having only a limited incident angle to enter said light shielding means.

12. An ultraviolet ray detecting device according to claim 11, wherein said means for limiting the light incident angle is formed by narrowing a width of said light entrance means.

13. An ultraviolet ray detecting device according to claim 8, further comprising a protector means disposed in vicinity of or in contact with said ultraviolet ray extracting means.

14. An ultraviolet ray detecting device according to claim 8, wherein said means for preliminarily coloring the fluorescent member is a light emitting diode.

* * * * *